Oct. 29, 1963   J. M. LAFFERTY   3,109,115
MAGNETRON TYPE IONIZATION GAUGES
Filed Oct. 11, 1961
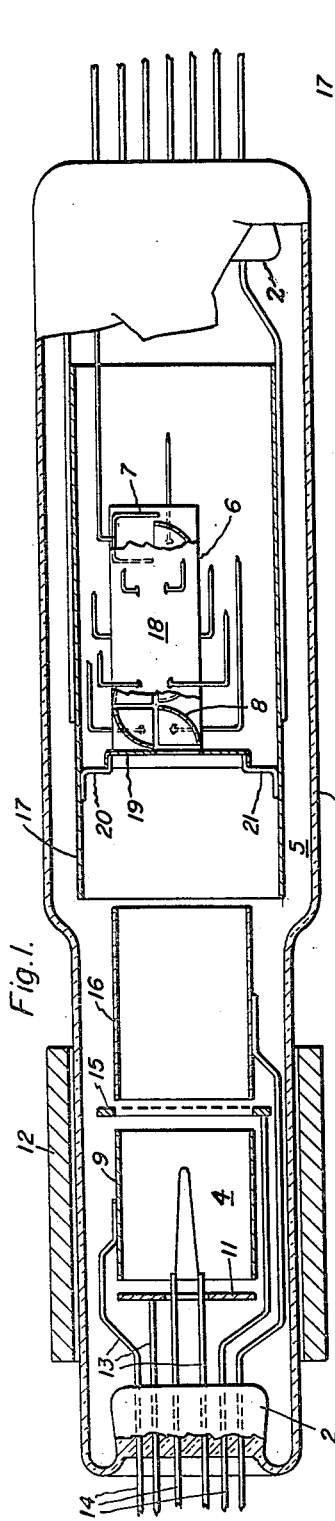
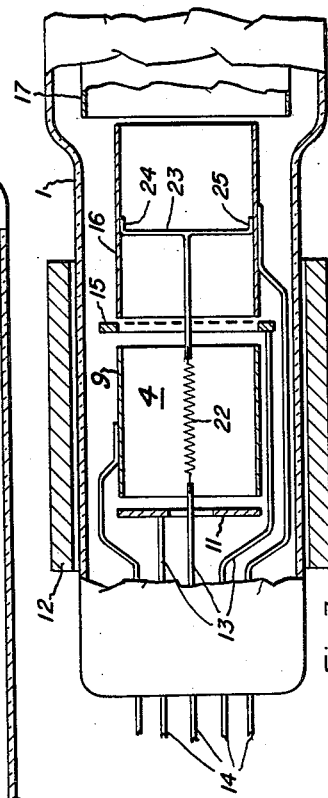
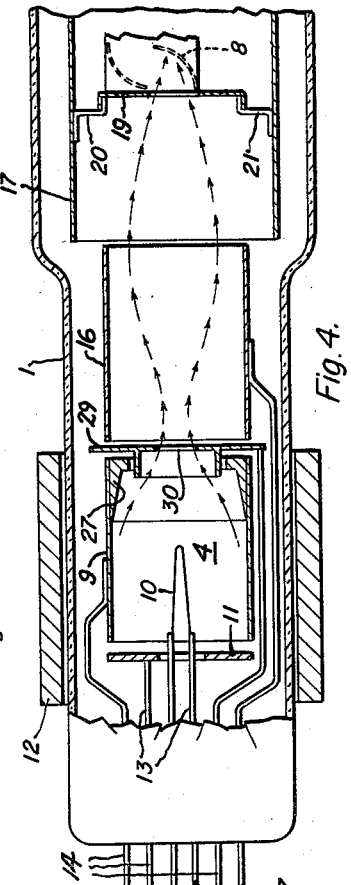
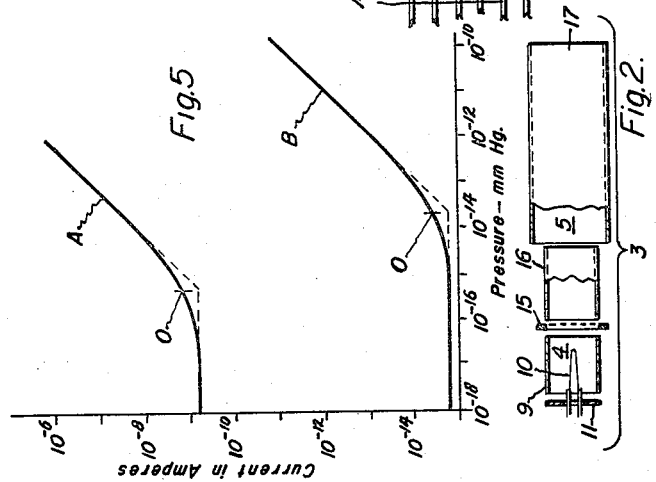
Inventor:
James M. Lafferty,
by Joseph V. Claeys
His Attorney.

United States Patent Office 3,109,115
Patented Oct. 29, 1963

3,109,115
MAGNETRON TYPE IONIZATION GAUGES
James M. Lafferty, Schenectady, N.Y., assignor to General Electric Company, a corporation of New York
Filed Oct. 11, 1961, Ser. No. 144,453
17 Claims. (Cl. 313—7)

This invention relates to ionization gauges and in particular to ionization gauges capable of measuring extremely low gas pressures.

Ionization gauges are gaseous discharge devices widely used for measuring gas pressures under high vacuum conditions. Such devices generally include a cathode, an anode and an ion collector. Electrons from the cathode undergo ionizing collisions with gas molecules within the gauge to generate positive ions which are collected by the ion collector. At low pressures the probability of such ionizing collisions is proportional to the number of gas molecules present. In such a device, therefore, the ion current to the ion collector is a measure of the gas pressure.

It has been found that the low pressure limit of such ionization gauges is imposed primarily by the residual current to the ion collector resulting from photoelectrons ejected from the ion collector by soft X-rays. These soft X-rays are produced by electrons striking the anode. Accordingly various attempts have been made in the prior art to extend the low pressure limit of such gauges by increasing the ratio of ion current to X-ray photocurrent for a given emission current.

It has been recognized in the art that the X-ray photocurrent depends upon such factors as the anode material and voltage, the work function of the ion collector material, and the solid angle which the ion collector presents to the X-rays from the anode. Prior art ionization gauges of the triode tube type designed with consideration of these factors wherein the cathode or filament is placed outside a cylindrical grid anode and the ion collector, in the form of a fine wire, is suspended within the cylindrical grid anode have been capable of measuring gas pressures as low as about $10^{-10}$ millimeters of mercury.

The low pressure limit of an ionization gauge has been also extended by increasing the sensitivity of the gauge. An improved magnetron-type ionization gauge of increased sensitivity employing an axial magnetic field of sufficient intensity to cause operation beyond cut-off conditions and which operates at low levels of electron emission current is described and claimed in my U.S. Patent No. 2,884,550. The improved magnetron ionization gauge of my above referenced patent is capable of measuring gas pressures as low as about $10^{-13}$ millimeters of mercury. Even in this improved ionization gauge, however, X-ray photocurrent from the ion collector, which can not be distinguished from the incident positive ion current, and the inability of the external measuring circuit to detect the very small ion current present at extremely low gas pressures has limited the lowest pressure that could be measured heretofore to about $10^{-13}$ millimeters of mercury.

It is an object of the present invention, therefore, to provide a new and improved ionization gauge which overcomes one or more of the prior art limitations and which is capable of measuring lower gas pressures than heretofore possible.

It is another object of this invention to provide an ionization gauge which provides for both a reduction in the amount of X-ray photocurrent and an increase in the ion current output at extremely low gas pressures.

It is still another object of this invention to provide an ionization gauge whose current output is essentially unaffected by soft X-rays produced by electrons striking the anode thereof.

It is a further object of this invention to provide an ionization gauge capable of measuring lower gas pressures than any ionization gauge heretofore known to the prior art.

It is a still further object of this invention to provide an ionization gauge wherein both the output current level and the ratio of ion current to X-ray photocurrent have been substantially increased providing an ionization gauge capable of measuring lower gas pressures than heretofore possible with any prior art means.

Briefly stated, in accordance with one aspect of this invention, an ionization gauge capable of measuring extremely low gas pressures comprises an evacuable envelope having ion beam projection means at one end thereof and ion beam receiving means opposite the ion beam generating and projecting means. The ion beam receiving means may be in the form of an electron multiplier means having an output electrode and at least a first dynode; the first dynode being positioned at the focal point of the projected ion beam. The ion beam intercepted by the first dynode causes ejection of secondary electrons therefrom which are collected by the output electrode to produce an output current representative of the amplified ion current.

The novel features believed characteristic of this invention are set forth particularly in the appended claims. The invention itself, together with further objects and advantages thereof, may best be understood by reference to the following detailed description taken in conjunction with the accompanying drawings in which:

FIGURE 1 is a sectional view of an ionization gauge constructed in accordance with one embodiment of this invention, FIGURE 2 is a detail view, partly in section, of the ion beam projecting means of FIGURE 1, FIGURE 3 is a partial view in section of an embodiment of this invention employing a single coaxial filament, FIGURE 4 is a partial view in section illustrating still another embodiment of this invention; and, FIGURE 5 illustrates the increase in output current level and ionization gauge linearity between an ionization gauge constructed in accordance with this invention and a prior art magnetron-type ionization gauge.

*General Description*

The ionization gauge of the present invention largely overcomes the prior art limitations on the lowest pressure which can be measured by providing a structure wherein both the output current level and the ratio of ion current to X-ray photocurrent have been significantly increased. An ion beam is focused upon a small area secondary emitting electrode positioned remote from the source of the ions. In this way it has been found that the ratio of the output currents due to ions and to X-ray photons is increased as a result of both the utilization of secondary emission in the ion beam receiving means and the reduction in the solid angle subtended by the secondary emitting electrode to the soft X-rays ejected from the anode at the source of the ion beam. This small solid angle is made possible by the small area required by the dynode to intercept the projected ion beam and the position of the dynode at a distance from the source of the soft X-rays which, when incident on the ion collector, result in the undesirable X-ray photocurrent. The X-ray photocurrent is made still smaller resulting in a still larger ratio of ion current to X-ray photocurrent in another embodiment of this invention wherein the soft X-rays developed within the ion generating means are essentially prevented from reaching the dynode of the ion beam receiving means.

The ionization gauge of the present invention comprises an ion beam projecting means and an ion beam receiving means mounted in opposed spaced relation within a suitable enclosure. The ion beam projecting means includes an ion generating means, an ion accelerating means, and an ion focusing means.

Since all electrostatic and magnetic fields with either circular or "two dimensional" symmetry possess the properties of optical lenses they can project electron optical images. The ion beam projecting means utilized in the practice of this invention, therefore, may include either an electrostatic or a magnetic lens system or a combination of electrostatic and magnetic lenses. Combined electric and magnetic fields are often particularly desirable, for example, whenever the ions are to be accelerated and magnetically focused at the same time. The ion focusing means utilized may be constructed in accordance with well-known principles of electron optics. For example, suitable electric fields may be produced by electrodes in the form of cylindrical tubes or in the form of plane apertured diaphragms. Similarly, suitable magnetic fields may be produced by electric coils, iron shielded electric coils or by permanent magnets. Further details on the application of electron optical principles to provide a means of beam concentration or deflection may be had by reference to the text entitled "Electron Physics," by O. Klemperer, published in 1959 by Butterworths Scientific Publications, London.

The ion beam receiving means includes an output electrode and at least one secondary emitting electrode or "dynode." The ion beam receiving means is so positioned within the enclosure that the dynode is remote from the ion generating means and at the focal point of the projected ion beam. Conveniently, the ion beam receiving means may be an electron multiplier means, having a plurality of dynodes, mounted within the enclosure to provide that the first dynode thereof is at the focal point of the projected ion beam.

In the operation of the ionization gauge in accordance with this invention, ions from the ion generating means are subjected to the action of an electric field to cause them to be withdrawn therefrom and accelerated through an appropriate ion focusing means. The ions are thus formed into a well-defined beam and focused onto the dynode of the ion beam receiving means.

In one embodiment of this invention, ions are withdrawn and accelerated by a perforate or grid-like electrode disposed proximate the ion generating means. In another embodiment of this invention ions are withdrawn and accelerated by an electrostatic lens in the form of a plane apertured diaphragm. The aperture of the lens is positioned, with respect to the lens and the electric field established thereby, at the most concentrated region of the ion beam. In this latter construction soft X-rays developed within the ion generating means are confined within the cathode-anode space of the ion generating means and are essentially prevented from being intercepted by the dynode of the ion beam receiving means.

The impact of ions on the dynode causes secondary electrons to be ejected. The resulting current is then amplified by the electron multiplier, or other ion beam receiving means utilizing secondary emission, in well-known manner.

In accord with this invention, therefore, an ionization gauge is provided wherein both the output current level as well as the ratio of the ion current to X-ray photocurrent are increased resulting in a substantial extension in the low pressure limit of the ionization gauge. For example, ionization gauges constructed in accordance with this invention are capable of measuring gas pressures lower than about $10^{-15}$ millimeters of mercury as compared to a pressure of about $10^{-13}$ millimeters of mercury with the best ionization gauges known heretofore.

Detailed Description

The ionization gauge illustrated in FIGURE 1, constructed in accordance with one embodiment of this invention, includes an enclosure 1 which may be an evacuable envelope of glass or other suitable material having reentrant portions 2 at each end thereof. An ion beam projecting means 3, shown in detail in FIGURE 2, including ion generating means 4 and ion accelerating and focusing means 5, is mounted at one end of the enclosure 1. An ion beam receiving means 6, having an output electrode 7 and at least one secondary emitting electrode 8, is mounted at the opposite end of the enclosure. The ion beam receiving means is positioned with the enclosure 1 with respect to the ion beam projecting means to assure that electrode 8 is at the focal point of the projected ion beam.

For clarity and simplicity of description, secondary emitting electrode 8 will be referred to throughout the specification and in the appended claims as the "first dynode" and is intended thereby to include the first dynode of an electron multiplier means having a plurality of dynodes as well as the secondary emitting electrode of an ion beam receiving means which may have but a single such electrode.

Ion Generating Means

Ion generating means 4 is of the magnetron-type including an anode cylinder 9, a cathode 10 mounted axially within the anode cylinder, and an electron shield electrode 11 proximate one end of the anode cylinder. Cathode 10 may be a doubled "hairpin-type" filament of tungsten or the like as is conventional. Since a usual .008 inch diameter tungsten filament, however, operates at about 1,300° C., a residual photoelectric current may be produced at the first dynode due to the light from the glowing filament. Any difficulty due to such light in the extremely sensitive ionization gauge of this invention may be overcome by using a lanthanum boride cathode such as that described and claimed in my U.S. Patent, No. 2,659,685. Such a cathode supplies an emission current of about $10^{-7}$ amperes at a temperature of about 675° C. The light from the filament at this temperature does not produce any detectable photocurrent at the dynode of the ion beam receiving means. A still further advantage of using the lanthanum boride cathode is the reduction in gas reactions at the heated cathode. For example, in many instances the low pressure limit of the ionization gauge may be due to gases generated or liberated by reactions involving the hot cathode. Such gas reactions are greatly reduced when the cathode temperature is kept at a low value. Means for applying an axial magnetic field of sufficient intensity to provide operation beyond "cut-off" value comprises a cylindrical magnet 12 which may be either a permanent magnet or an electromagnetic coil. When the ionization gauge is constructed with an enclosure 1 of glass or like material the cylindrical magnet 12 may be conveniently slipped over the enclosure as illustrated.

The respective electrodes 9, 10 and 11 of ion generating means 4 may be mounted within the enclosure 1 in any manner well-known in the art. For example, the electrodes may be suitably supported by a plurality of support rods 13 which extend through and are suitably sealed to the re-entrant portion 2 of the enclosure. The appropriate terminal portions 14 of support rods 13 may then be utilized to apply the appropriate operating potentials to the various electrodes of the ion generating means.

Ions are produced in the ion generating means 4 in a well-known manner by ionizing collisions between electrons and gas molecules within the anode-cathode space. Due to the applied magnetic field employed in the magnetron-type structure the electron paths from cathode to anode are increased in length so that the number of ionizing collisions per electron is increased. For example, when the structure is operated in a magnetic field with an intensity greater than cut-off value, the electrons from the cathode are caused to travel in spiral paths and fail to reach the anode, thus providing an ion generating means of extremely high efficiency. The collisions between the electrons and gas molecules, therefore, result in the generation of positive ions within the cathode-anode space defined by the anode cylinder 9.

Although in FIGURE 1, and the other figures of the drawing, ion generating means 4 is illustrated as being of the magnetron type, it is to be understood that this invention is not intended to be limited to an ion generating means of any specific structure. The magnetron structure is preferred, however, because of the high ionizing efficiency of the electrons in this structure when it is operated in a magnetic field with an intensity greater than cut-off value. Further, the magnetron structure is also preferred since an operation at cut-off or below the amount of soft X-rays emitted by the anode thereof may be greatly reduced, without sacrificing the ion current per unit pressure.

*Ion Accelerating and Focusing Means*

The ion accelerating and focusing means 5 includes means for establishing an electric field to cause ions to be withdrawn from the ion generating means and for accelerating these ions in a direction away from the ion generating means approximately parallel with the major axis of the ionization gauge, and means for focusing these ions onto the first dynode 8 of the ion beam receiving means 6. In the embodiment illustrated in FIGURE 1, the means for withdrawing and accelerating ions from the ion generating means is in the form of a perforate ion accelerating electrode 15 spaced from the anode cylinder 9 of the ion generating means 4. Alternatively, electrode 15 may be in the form of a grid, a mesh, a honeycomb structure or other structure suitable for establishing an electric field for withdrawing and accelerating ions from the ion generating means. Electrode 15 may again be suitably supported in a known manner by one or more of the support rods 13 extending through and sealed to the re-entrant portion 2 of the enclosure 1.

The ion focusing means comprises an electrostatic lens system including first and second cylinders 16 and 17 respectively mounted coaxially in spaced relation. First cylinder 16 is supported by suitable support rods 13 extending through and sealed to re-entrant portion 2 at one end of enclosure 1 while second cylinder 17 is supported by suitable support rods 13 extending through and appropriately sealed to re-entrant portion 2 at the opposite end of enclosure 1.

An ion beam receiving means 6 such as for example, a commercial multi-stage electron multiplier 18, is mounted within cylinder 17. Thus, in addition to its function as part of the electrostatic lens system, cylinder 17 serves as an electrostatic shield for the ion beam receiving means. The entrance apertured member 19 of electron multiplier 18 is secured directly to the walls of cylinder 17 by supporting brackets 20 and 21 respectively while the connections to the various dynodes and the output electrode 7 may be made to suitable support rods 13 which extend through and are sealed to the reentrant portion 2 to provide required additional support for electron multiplier 18; the appropriate terminal portions of such support rods again being utilized for applying operating potentials to the electron multiplier device and for taking the output therefrom.

The focal point of the projected ion beam depends upon the relative diameters and lengths of the coaxially mounted cylinders 16 and 17 as well as on the potentials applied to them. The exact position at which electron multiplier 18 is mounted, therefore, is governed by these factors. For example, in a typical ionization gauge constructed in accordance with FIGURE 1 of this invention cylinder 15 may be about 1 inch in diameter and 1½ inches in length and cylinder 17 may be about 1½ inches in diameter and about 3½ inches in length. With −45 volts applied to ion accelerating electrode 15 and about −3000 volts applied to cylinder 17, the focal point of the ion beam is located about one inch from the end of cylinder 17 with a voltage of +50 volts applied to cylinder 16.

Further, it has been found that a focal point about 1.1 inches from the end of cylinder 17 may be provided with zero volts on cylinder 16. This discovery is utilized in the embodiment of this invention illustrated in FIGURE 3 and described in detail hereinafter.

In accordance with this invention, therefore, ions from the ion generating means are projected in a well-defined beam and focused onto the first dynode of the ion beam receiving means. Since the first dynode is only required to intercept this well-defined ion beam its area may be much smaller than would be required for an ion collector of conventional prior art ionization gauges. In addition, the first dynode is positioned remote from the ion generating means and hence is removed some distance from the source of the soft X-rays produced as a result of electrons striking the anode. Thus, the solid angle subtended by the first dynode to the soft X-rays originating in the ion generating means is extremely small. The ratio of ion current to X-ray photocurrent is also increased by the number of secondary electrons emitted per incident positive ion on the dynode. For example, with about 3000 volts across a conventional 10 stage electron multiplier device, the secondary emission coefficient is in the order of two or three. Such a gain is not achieved in the case of the conventional ionization gauge since the ion current in such devices is measured directly from the ion collector without the benefit of secondary emission. For these reasons the ratio of output currents in the ion beam receiving means due to ions and to X-ray photons is found to be significantly larger than has been achieved heretofore thereby making possible the measurement of extremely low gas pressures.

For many applications it may be desirable to provide an ionization gauge having a more rigid cathode structure than can be achieved by the doubled filament illustrated in FIGURE 1. For example, the single coaxial filament having support at each end has been known to provide an extremely rigid structure for magnetron-type ionization gauges. Due to the various operating potentials applied to the electrodes of the ion accelerating and focusing means of this invention to provide for suitably projecting the ion beam, the usual mounting techniques for such a single coaxial filament may not be conveniently employed.

In FIGURE 3 there is shown another embodiment of this invention, therefore, which provides for the use of a single coaxial filament and for convenient support at each end. The use of such a filament structure is made possible by operating cylinder 16 at zero voltage. In this way the single coaxial filament 22 may be supported at one end in the usual manner as by a support rod 13; the other end of filament 22 being connected to a suitable support 23 secured directly to the inside of cylinder 16. For example, support 23 may be a crossbar secured at its ends 24 and 25 to the inside wall of cylinder 16. Again this support connection is possible since cylinder 16 is at zero voltage.

As described hereinbefore the focal point of the ion beam depends, among other factors, upon the respective voltages applied to the ion accelerating electrode 15 and cylinders 16 and 17. Accordingly, in this embodiment the first dynode 8 of the ion beam receiving means must be suitably mounted at the focal point of the ion beam which results with cylinder 16 at zero voltage. For example, in the typical ionization gauge described hereinbefore having a cylinder 16 of about 1 inch in diameter and 1½ inches in length and cylinder 17 about 1½ inches in diameter and about 3½ inches in length, the focal point of the ion beam with −45 volts on ion accelerating electrode 15, −3000 volts on cylinder 17, and zero volts on cylinder 16 is at about 1.1 inches from the end of cylinder 17. This compares with a focal point at about 1 inch from the end of cylinder 17 with +50 volts on cylinder 16. Thus, by suitably mounting the ion beam receiving means within cylinder 17, cylinder 16 may be operated at zero volts thereby allowing for the convenient connection thereto for the support of a single coaxial filament.

In FIGURE 4 there is shown another embodiment of this invention wherein the X-ray photocurrent is reduced to an extremely low value by essentially preventing the soft X-rays which originate in the ion generating means from being intercepted by the dynode of the ion beam receiving means. To this end anode cylinder 9 is provided with a tapering restricting portion 27 at the end remote from shield electrode 11. In addition the perforate ion accelerating electrode 15 is replaced with an apertured diaphragm 29. Diaphragm 29 is suitably supported in spaced relation with anode cylinder 9 by a support rod 13 in the usual manner. The electric field established between the apertured diaphragm 29 and the tapered portion 27 of anode cylinder 9 produces a lens action which causes the ions to be withdrawn from the cathode-anode space, concentrated into a beam and accelerated through the aperture 30 of diaphragm 29. Diaphragm 29 is so positioned with respect to anode cylinder 9 and the electric field established therebetween to assure that aperture 30 is at about the most concentrated portion of the ion beam. In this way the soft X-rays which result from electrons striking the anode cylinder 9 are almost completely confined within the cathode-anode space.

The electric field produced between the apertured diaphragm 29 and the tapered portion 27 causes ions to be accelerated from ion generating means 4 in the form of a small diameter beam through aperture 30 and into the second ion focusing means which includes cylinders 16 and 17. Since aperture 30 is positioned at the most concentrated portion of the ion beam its diameter may be sufficiently small to prevent the escape of essentially all the soft X-rays from the ion generating means while at the same time allowing the passage of the small diameter ion beam. Since there is very little scattering of the soft X-rays only a very small quantity of them are released through aperture 30 to be intercepted by the first dynode to produce the undesirable X-ray photocurrent. For example, the first dynode 8 of the ion beam receiving means is essentially unable to "see" the anode 9 of ion generating means 4 due to the small apertured diaphragm 29. Thus, in the absence of X-ray scattering essentially none of the soft X-rays from the anode are intercepted by the first dynode. Due to this extremely low value of X-ray photocurrent, ionization gauges constructed in accordance with this embodiment of this invention are limited in the lowest gas pressure which can be measured only by background effects.

The extension of the low pressure measuring limit of the ionization gauge of this invention may be better illustrated by the following specific data obtained from an ionization gauge constructed in accordance with FIGURE 1.

At a normal operating potential of about +300 volts applied to anode cylinder 9, one X-ray photoelectron, on the average, is found to be ejected for every 50 million electrons striking the anode. This is 20 times less X-ray photocurrent than is obtained from the ion collector electrode of prior art magnetron-type ionization gauges employing the conventional ion collector disk. Further, the secondary emission coefficient was found to be about 2.75 with about 3000 volts across a ten stage electron multiplier device. About 20 percent of the ions from the ion generating means is lost to the ion accelerating electrode and the electrostatic lens system so that about 80 percent of the ion current is intercepted by the first dynode. From the above operating data it may be seen that there is an overall increase in the ratio of ion current to X-ray photocurrent of about 44.

$$(20 \times 2.75 \times 0.80 = 44)$$

In FIGURE 5, curve A represents the output current characteristic as a function of gas pressure of an ionization gauge constructed in accordance with FIGURE 1 of this invention. The point 0 indicates the pressure at which the ion current and the X-ray photocurrent are of equal magnitude. Curve B represents the same characteristic for a prior art magnetron-type ionization gauge with the point 0 again indicating the pressure at which ion current and X-ray photocurrent are equal.

A comparison of the two curves of FIGURES 5 illustrates clearly the increased output current level as well as the increased ratio of ion current to X-ray photocurrent for the ionization gauge in accordance with this invention. For example, curve A shows a much higher current level as well as linearity down to a much lower gas pressure than does curve B. The increased ratio of ion current to X-ray photocurrent together with the higher output current level as a result of the utilization of secondary emission makes possible the measurement of gas pressures lower than about $10^{-15}$ millimeters of mercury.

There has been described hereinbefore, therefore, a new and improved ionization gauge which substantially increases both the output current level and the ratio of ion current to X-ray photocurrent thereby providing an ionization gauge capable of measuring lower gas pressures than possible heretofore. This is accomplished in accordance with this invention by projecting a small diameter ion beam upon a secondary emitting electrode of a suitable ion beam receiving means disposed at a position remote from the source of the ion beam and hence remote from the source of undesirable soft X-rays. The ionization gauges constructed in accordance with this invention are easily capable of measuring gas pressures lower than about $10^{-15}$ millimeters of mercury.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. An ionization gauge comprising: an evacuable envelope; an ion generating means; ion accelerating and focusing means; an electron multiplier means including an output electrode and at least a first dynode; means for mounting said ion generating means, said ion accelerating and focusing means, and said electron multiplier, means in spaced relation and in the order named within said evacuable envelope, the said first dynode of said electron multiplier means being disposed remote from said ion generating means and positioned at the focal point of said accelerated ions.

2. An ionization gauge comprising: an evacuable envelope having a major axis; an ion generating means mounted within said envelope; means mounted in spaced relation with said ion source establishing an electric field to cause ions to be withdrawn from said ion generating means and accelerated in a direction approximately parallel with the major axis of said envelope; an ion beam receiving means having an output electrode and at least a first dynode disposed within said envelope remote from and opposite said ion generating means; and means for focusing said accelerated ions on the said first dynode of said ion beam receiving means to cause the emission of electrons therefrom.

3. The ionization gauge of claim 2 wherein said ion generating means is of the magnetron-type including an anode cylinder, a cathode mounted axially within said cylinder, an electron shield electrode proximate and spaced from one end of said anode cylinder, and electric bias and magnetic field means for operating said ion generating means beyond cut-off conditions.

4. The ionization gauge of claim 3 wherein said cathode is a doubled filament of the hairpin-type.

5. The ionization gauge of claim 3 wherein said cathode is a single axial filament rigidly supported at each end.

6. The ionization gauge of claim 2 wherein said means for establishing an electric field to withdraw and accelerate ions from said ion generating means is a perforate electrode member disposed in close juxtaposition to said ion generating means.

7. The ionization gauge of claim 2 wherein said means for establishing an electric field to withdraw and accelerate ions from said ion generating means is an apertured diaphragm disposed in close juxtaposition to said ion generating means.

8. The ionization gauge of claim 2 wherein said means for focusing said ions onto the first dynode of said electron multiplier means is an electrostatic lens system.

9. The ionization gauge of claim 8 wherein said electrostatic lens system includes a pair of cylindrical members mounted in spaced relation with said envelope along the axis of said ion beam between said ion generating means and said ion beam receiving means, the relative dimensions of said cylindrical members, the spacing therebetween, their relative position with respect to said ion beam receiving means, and the potentials applied to said cylindrical members being correlated to provide the focal point of said electrostatic lens system at said first dynode.

10. The ionization gauge of claim 2 wherein said ion beam receiving means is an electron multiplier device having an output electrode and a plurality of dynodes.

11. An ionization gauge comprising: an evacuable enclosure; an ion generating means of the magnetron-type mounted at one end of said enclosure, said ion generating means including an anode cylinder, a thermionic cathode mounted axially within said cylinder, an electron shield electrode mounted proximate to and spaced from one end of said anode cylinder, and electrical bias and magnetic field means for operating said ion generating means beyond cut-off conditions; a perforate ion accelerating electrode mounted proximate to and spaced from the other end of said anode cylinder; an electrostatic lens mounted in spaced relation with said ion accelerating electrode for focusing said accelerated ions, said lens including a first cylinder coaxial with said anode cylinder spaced from said ion accelerating electrode and a second cylinder coaxial with and spaced from said first cylinder; and an ion beam receiving means having an output electrode and at least a first secondary emitting electrode mounted within said second cylinder with said first secondary emitting electrode at the focal point of said accelerated ions.

12. The ionization gauge of claim 11 wherein said ion beam receiving means is an electron multiplier device having an output electrode and a plurality of secondary emitting electrodes.

13. The ionization gauge of claim 10 wherein said thermionic cathode is a lanthanum boride filament.

14. An ionization gauge comprising: an evacuable enclosure; an ion generating means of the magnetron-type mounted at one end of said enclosure, said ion generating means including an anode cylinder, a thermionic cathode mounted axially within said anode cylinder, an electron shield electrode mounted proximate to and spaced from one end of said anode cylinder, and electrical bias and magnetic field means for operating said ion generating means beyond cut-off conditions; means associated with the other end of said anode cylinder providing a tapering restricting portion thereat; an apertured diaphragm electrode proximate to and spaced from the said other end of said anode cylinder, said apertured diaphragm electrode and the tapered restricting portion of said anode cylinder producing a lens action causing ions to be withdrawn from said ion generating means and accelerated as a small diameter beam in a direction away from said ion generating means; an electrostatic lens mounted in spaced relation with said apertured diaphragm electrode for focusing said accelerated ions, said lens including a first cylinder spaced from said apertured diaphragm electrode and coaxial with said anode cylinder and a second cylinder coaxial with and spaced from said first cylinder; and an ion beam receiving means having an output electrode and at least a first secondary emitting electrode mounted within said second cylinder with said first secondary emitting electrode at the focal point of said accelerated ion beam.

15. The ionization gauge of claim 14 wherein said ion beam receiving means is an electron multiplier device having an output electrode and a plurality of secondary emitting electrodes.

16. An ionization gauge comprising: an evacuable envelope; ion generating means; ion accelerating and focusing means; electron multiplier means including an output electrode and secondary emitting input means; and means for mounting said ion generating means, said ion accelerating and focusing means, and said electron multiplier means being in spaced relation and in the order named within said evacuable envelope, the secondary emitting input means of said electron multiplier means being disposed remote from said ion generating means and positioned at the focal point of said accelerated ions.

17. An ionization gauge comprising: an evacuable envelope having a major axis; an ion generating means mounted within said envelope; means mounted in spaced relation with said ion source establishing an electric field to cause ions to be withdrawn from said ion generating means and accelerated in a direction approximately parallel with the major axis of said envelope; and ion beam receiving means having an output electrode and secondary emitting input means disposed within said envelope remote from and opposite said ion generating means; and means for focusing said accelerated ions on the secondary emitting input means of said ion beam receiving means to cause the emission of electrons therefrom.

References Cited in the file of this patent
UNITED STATES PATENTS

| | | |
|---|---|---|
| 2,762,928 | Wiley | Sept. 11, 1956 |
| 2,999,157 | Rosenstock | Sept. 5, 1961 |